No. 748,195. PATENTED DEC. 29, 1903.
A. O. LAMSON.
SELF ADJUSTING CAR FENDER.
APPLICATION FILED MAR. 12, 1903.
NO MODEL. 3 SHEETS—SHEET 1.
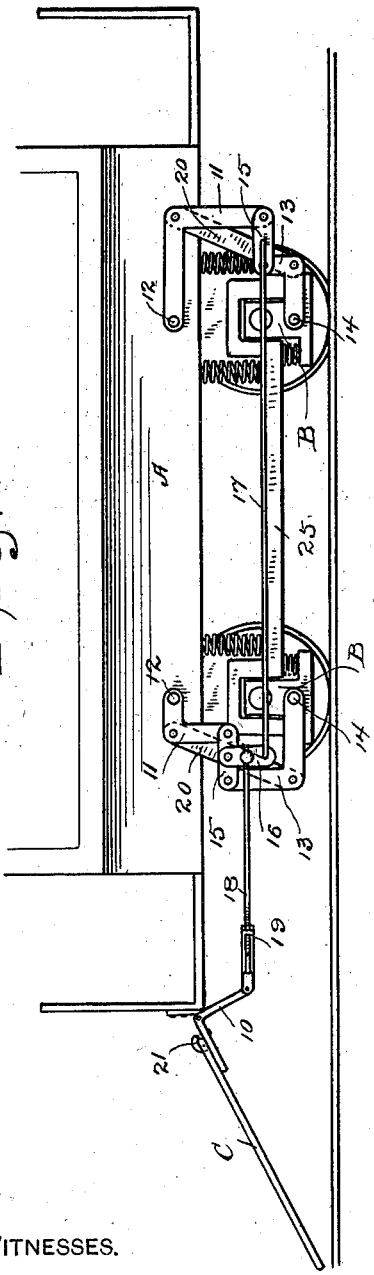
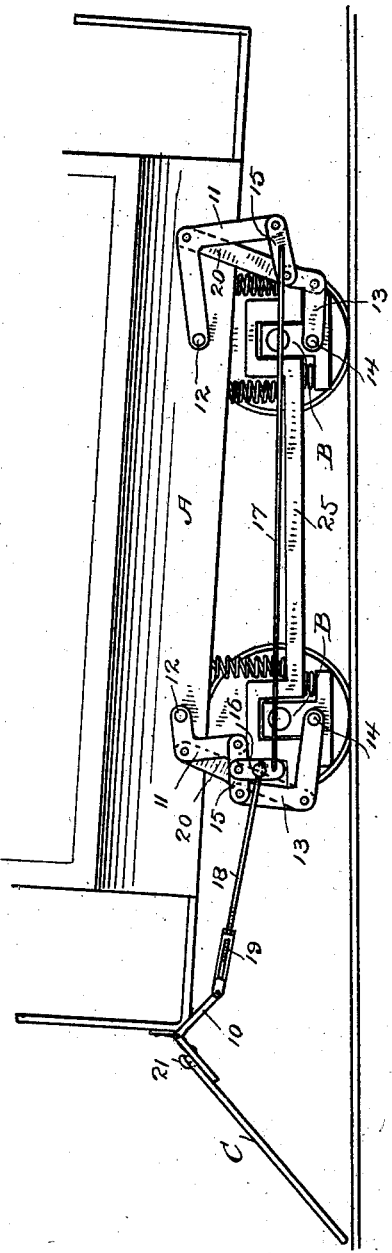
WITNESSES.
H. A. Lamb
S. W. Atherton
INVENTOR.
Alexander O. Lamson
By A. M. Wooster
Atty.

No. 748,195. PATENTED DEC. 29, 1903.
A. O. LAMSON.
SELF ADJUSTING CAR FENDER.
APPLICATION FILED MAR. 12, 1903.
NO MODEL. 3 SHEETS—SHEET 2.
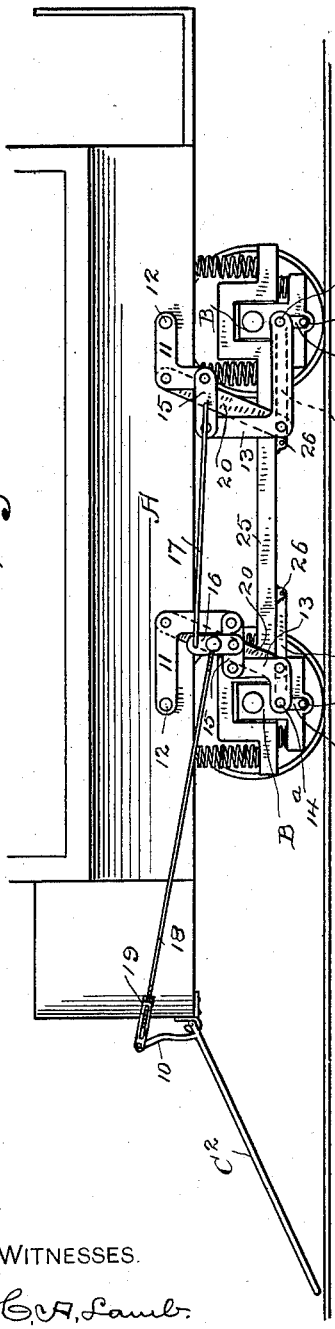
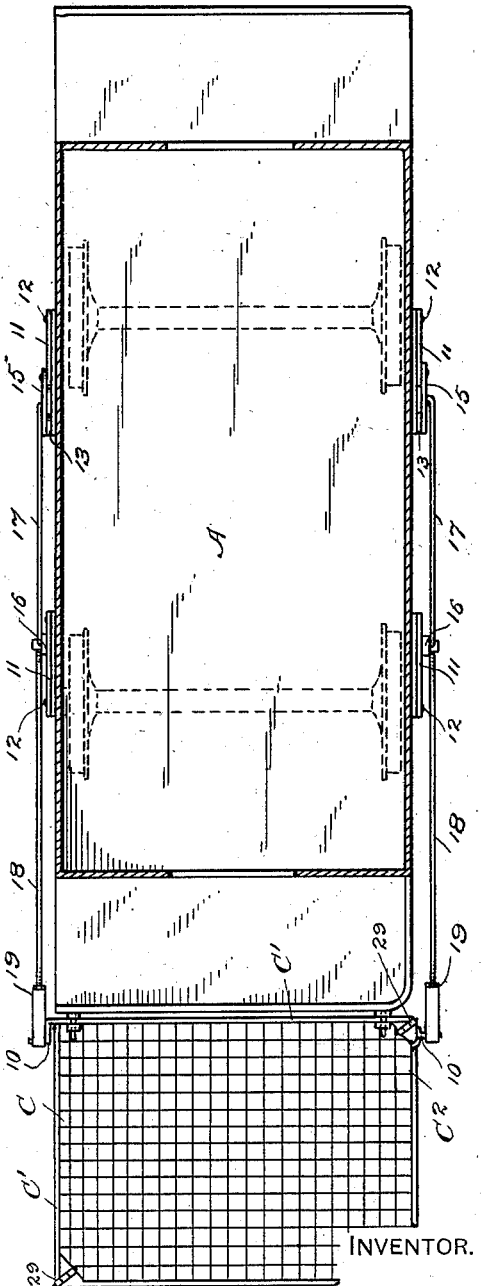
WITNESSES. INVENTOR.

No. 748,195. PATENTED DEC. 29, 1903.
A. O. LAMSON.
SELF ADJUSTING CAR FENDER.
APPLICATION FILED MAR. 12, 1903.
NO MODEL. 3 SHEETS—SHEET 3.
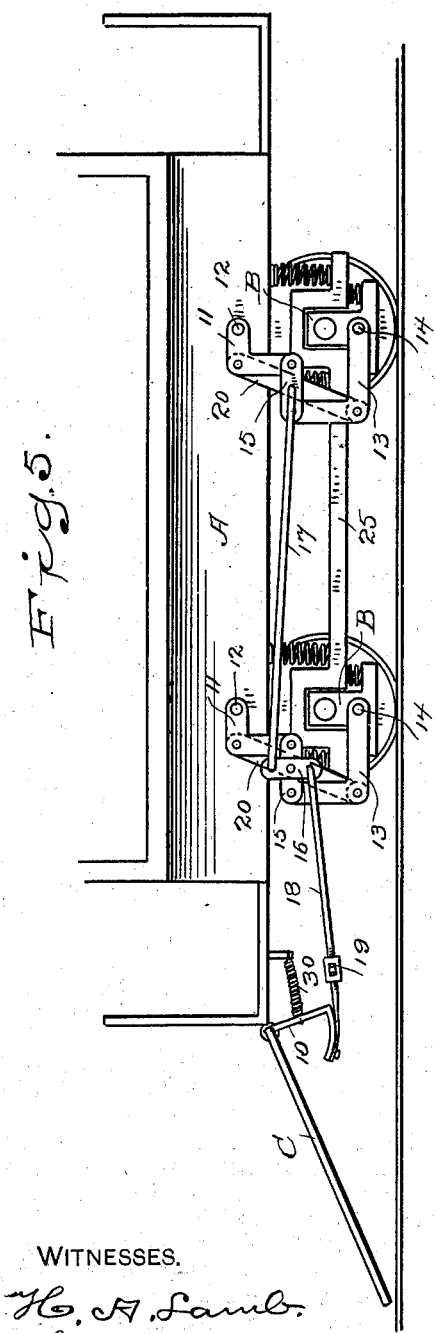
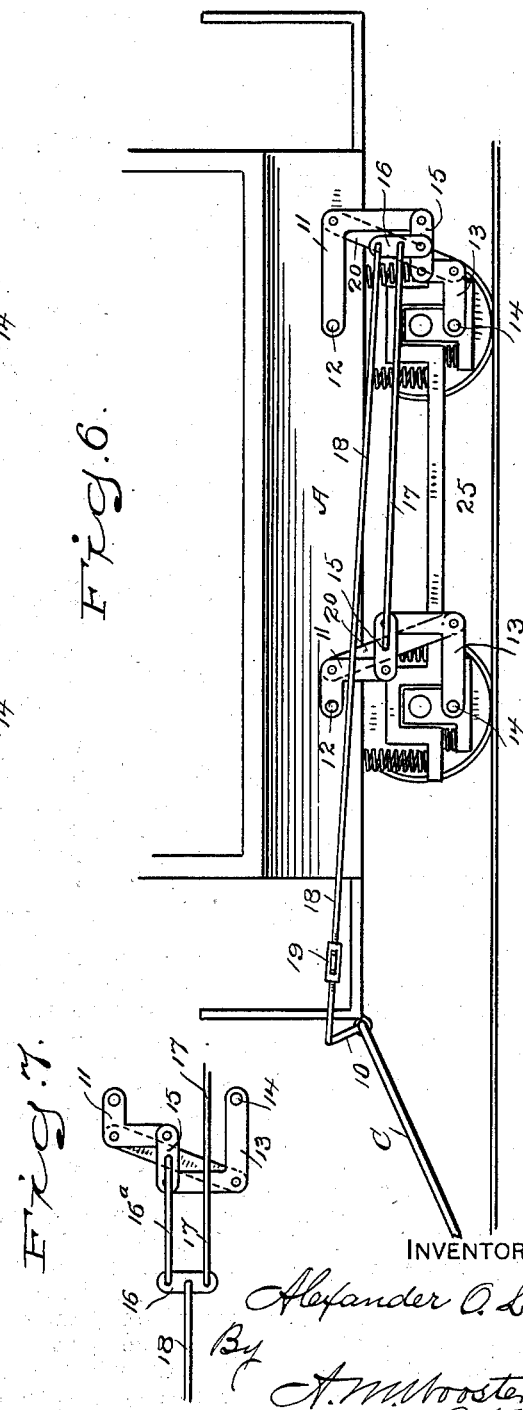
WITNESSES. INVENTOR.
H. A. Lamb. Alexander O. Lamson
J. W. Atherton. By A. M. Wooster
Atty.

No. 748,195. Patented December 29, 1903.

UNITED STATES PATENT OFFICE.

ALEXANDER O. LAMSON, OF BRIDGEPORT, CONNECTICUT.

SELF-ADJUSTING CAR-FENDER.

SPECIFICATION forming part of Letters Patent No. 748,195, dated December 29, 1903.

Application filed March 12, 1903. Serial No. 147,435. (No model.)

*To all whom it may concern:*

Be it known that I, ALEXANDER O. LAMSON, a citizen of the United States, residing at Bridgeport, county of Fairfield, State of Connecticut, have invented a new and useful Self-Adjusting Car-Fender, of which the following is a specification.

My invention has for its object to provide a self-adjusting car-fender and connecting and positioning mechanism therefor which shall be simple and economical in construction, so as to adapt it to be conveniently attached to new cars in building or to cars already in use, which shall be strong and durable in every part and, most important of all, shall be so constructed and connected that in use the fender will automatically adjust itself to the motion of the car, both sides of the forward edge of the fender remaining at substantially the same distance from the rails whether the car is carrying a light or heavy load or the load is evenly or unevenly distributed, whether the track is even or uneven or straight or curved, whether the speed is fast or slow, and when either end of the car is raised or depressed or either side of the car is raised or depressed, as from an unevenly-distributed load, the connecting and positioning mechanism acting to raise the forward edge of the fender correspondingly when the front end of the car is depressed and to depress the forward edge of the fender correspondingly when the front end of the car is raised and the construction of the fender itself insuring that when either side of the car is depressed, as by excess of weight upon that side, the corresponding side of the forward edge of the fender will be correspondingly raised, so that whatever may be the position or the movements of the car both sides of the forward edge of the fender will always remain at substantially the same distance from the rails, thus practically eliminating the danger of a person or an obstruction on the track being passed over by the fender and struck by the wheels, my novel fender making it practically certain that either on rough or smooth tracks or on curves or when running fast or slow and without regard to whether the load is heavy or light or well-balanced or heaviest upon either end or side a person or obstruction on the track will be picked up by the fender, and thus be prevented from being struck by the wheels.

With these ends in view I have devised the novel car-fender and intermediate connecting and positioning mechanism, which I will now describe, referring to the accompanying drawings, forming part of this specification, and using reference characters to designate the several parts.

Figure 1 is a side elevation illustrating the application of my novel fender and connecting and positioning mechanism to a car-body, the parts being in the normal position, as when a car is moderately loaded. Fig. 2 is a similar view illustrating the operation of my novel fender and connecting and positioning mechanism when the front end of the car is raised, as from an unduly heavy load in the rear or when passing rapidly over a rough road-bed; Fig. 3, a view similar to Fig. 1, but illustrating certain modifications in the details of construction and also my preferred form of fender; Fig. 4, a plan view corresponding with Fig. 3, the fender being shown as provided with hinges at diametrically opposite corners which act to cause either side of the forward edge of the fender to drop correspondingly as that side of the car is raised; Figs. 5 and 6, views similar to Fig. 1, but illustrating other modifications in the fender and in the connecting and positioning mechanism; and Fig. 7 is a detail view illustrating still another change in the details of the connecting and positioning mechanism.

A denotes a car-body, and B bearing-pieces, which may be of any ordinary or preferred construction.

C denotes my novel fender as a whole, which is pivoted to the front of the car and is provided on either or both sides at its rear end with an angle-arm 10.

An important feature of novelty in my invention lies in the interposition between the angle-arm and the car-body of my novel automatic connecting and positioning mechanism, which may or may not be duplicated on the opposite sides of the car, one side only being shown except in Fig. 4. The mechanisms located at the front and rear bearing-pieces comprise, essentially, a bell-crank lever 11, pivoted to the body, as at 12, a bell-crank lever 13, pivoted to the bearing-piece, as at 14, and a pivoted link 15, connecting the free ends of said bell-crank levers.

16 denotes a link which is connected to one of the links 15. The front and rear mechanisms are connected by a rod 17, pivoted to the link 16 and to the other link 15, and the fender is connected to the positioning mechanism by means of a connecting-rod 18, the front end of which is pivoted to angle-arm 10 and the rear end to link 16.

The underlying principle of construction of the front and rear mechanisms is that the several parts of said mechanisms are so proportioned relatively to each other and are so connected, no matter which of the arrangements shown in the drawings may be adopted, that when the car-body moves up and down evenly—that is, does not rock from end to end—the action of said mechanisms is in opposition—that is, each counteracts the other. When the normal action of one mechanism is to raise the fender, the normal action of the other mechanism is to lower it, so that the upward or downward movement imparted to the fender when the car-body moves up and down evenly is the difference in motion produced by the two mechanisms. It follows, therefore, as an essential principle of my invention that the front and rear mechanisms must be so laid out as to produce different motions—that is to say, one must produce a greater motion than the other; but it is wholly immaterial so far as the principle of the invention is concerned whether the greater motion is produced by the front or the rear mechanism. The laying out of these mechanisms is simply a matter requiring the ordinary skill of a designer, it being obvious that the amount of motion produced by the front and rear mechanisms and the excess of motion produced by one mechanism over the other are matters that must be regulated upon consideration of a number of different factors—as the length of the car, the proportions of the trucks and wheels, the height of the platform, and sometimes the character of the road upon which the car is to be used. It follows necessarily from the principle of operation just stated that when the car is tilted on its mid-length—that is, from end to end—the action of each mechanism will be to supplement the action of the other mechanism. The movement imparted to the fender, therefore, when the car is tilted from end to end will be the sum of movement of the two mechanisms—that is, the fender will move a distance equal to the movement of one mechanism plus the movement of the other mechanism—the fender swinging upward when the front end of the car tilts downward and swinging downward when the front end of the car tilts upward, as will be more fully explained.

The connecting-rod 18 is shown as made adjustable, as at 19. In order to steady the series of levers, I provide links 20, which are pivoted at the angles of bell-crank levers 11 and 13. In the form illustrated in Figs. 3 and 4 instead of pivoting bell-crank levers 13 directly to the bearing-pieces, as in the other forms, I pivot each bell-crank lever to a link 22, the other end of which is pivoted to the bearing-piece, as at 23. At the pivotal point of each bell-crank lever 13 to the corresponding link 22, which I have indicated in Fig. 3 by 14$^a$, is also pivoted a link 24, the rear end of which is pivoted to the side bar 25, as at 26. The object of links 22 and 24 is to permit slight forward and backward movement of the bearing-pieces without affecting the bell-crank levers and without in any way restricting the vertical movement of the bearing-pieces.

The form illustrated in Fig. 7 differs from the form illustrated in Fig. 1 only in that the link 16 instead of being pivoted directly to link 15 is connected thereto by means of a rod 16$^a$.

In Figs. 1 and 2 I have illustrated a form of fender which is made separate from angle-arm 10 and is detachably secured thereto, as at 21, the special mode in which the connection is made being unimportant so far as the principle of the invention is concerned. In the preferred form of fender, which is illustrated in Figs. 3 and 4, the angle-arms are made part of the fender, and both fender and angle-arms are removed from the car together, rods 18 being of course disconnected. The essential feature of this my preferred form of fender is that I make the frame of the fender in two parts, which I have indicated by C' and C$^2$, which are connected together by hinges 29 at diagonally opposite corners—that is to say, part C$^2$ is hinged to part C' on one side (the right side as seen in Fig. 4) at the forward edge of the fender and on the other side (the left side as seen in Fig. 4) at the back edge of the fender. On the side, as shown in the drawings, angle-arm 10, to which the connecting-rod 18 is pivoted, is rigidly secured to and extends from part C' and on the left side the angle-arm 10, to which the connecting-rod 18 is connected, is rigidly secured to and extends from part C$^2$—that is to say, on one side the attachment of the connecting-rod to the fender is back of the hinge and on the other side the attachment of the connecting-rod to the fender is forward of the hinge, the purpose of which will presently be fully explained.

The matter of whether the bell-crank levers 11 and 13 are placed substantially in front of the forward bearing-piece and behind the rear bearing-piece, as in Figs. 1 and 2, or substantially between the bearing-pieces, as in Figs. 3 and 4, or whether these two forms of arrangement are combined, as in Figs. 5 and 6, is unimportant so far as the principle of the invention is concerned and, as well as the laying out of the parts, may be left to the judgment of the manufacturer or to be determined by the special requirements of cars. Where my preferred form of fender is not used, but the connecting and positioning mechanism is intended to operate in connection with any ordinary style of fender, the angle-arms 10 may be permanently attached to the car and the attachment of connecting-rods 18 thereto be made below the level of the platform, as in Figs. 1 and 2, the fenders being detachably secured to the angle-arms. In my preferred form of fender, however, the frame is necessarily made in two parts, which are hinged together, and the angle-arms are shown as made part of the fender, so that in removing the fender from the car the angle-arms are removed also. The matter of whether the angle-arms 10 extend below their pivotal points to the car-body, as in Figs. 1, 2, and 5, or above their pivotal points to the car-body, as in Figs. 3, 4, and 6, is dependent upon the location of the link 16, to which the rear end of connecting-rod 18 is pivoted relative to the corresponding bearing-piece. Thus in the forms illustrated in Figs. 1, 2, and 5 the link 16, to which connecting-rod 18 is attached, is located in front of the forward bearing-piece, which necessitates that the fender be raised by a forward movement of said link 16 and the connecting-rod. The connecting-rod 18 in Figs. 1 and 2 must be made rigid enough to carry the weight of the fender.

In the form illustrated in Figs. 1 and 2 the fender drops by its own weight as soon as the forward thrust upon the connecting-rod is relieved.

In the form illustrated in Fig. 5 I have shown a spring 30 interposed between the angle-arm 10 and the platform of the car to overcome the action of gravity.

In the form illustrated in Figs. 3 and 4 the link 16, to which connecting-rod 18 is attached, is located back of the forward bearing-piece, which necessitates that the fender be raised by a pull upon the connecting-rod, the fender dropping again by gravity as soon as the pull is relieved.

In the form illustrated in Fig. 6 the link 16, to which connecting-rod 18 is attached, is located back of the rear bearing-piece, which necessitates that the connecting-rod be made longer. The principle of operation, however, is the same as in the form illustrated in Figs. 3 and 4.

The operation of the connecting and positioning mechanism will be readily understood from Figs. 1 and 2. In Fig. 1 the parts are shown in the normal position, the forward edge of the fender being a short distance above the track. The normal distance of the fender from the track may be readily adjusted by slightly lengthening or shortening the connecting-rod 18, as at 19. When the front end of the car is raised and the rear end depressed, as in Fig. 2, the ends of levers 11 and 13, which are pivoted to the links 15, are swung slightly toward the rear, carrying links 15 and with them links 16 slightly toward the rear, the effect of which is, through connecting-rod 18 and angle-arm 10, to swing the forward edge of the fender downward toward the rails a distance that will just compensate for the distance that the back edge of the fender has been raised through the raising of the front platform. It will be noted from Figs. 1 and 2 that the angle of the fender relative to the normal horizontal plane of the car is changed by this movement, the forward edge of the fender swinging backward relatively as it swings downward. An essential feature of the invention is that the parts are so proportioned and adjusted that the relative downward movement of the forward edge of the fender will just equal the upward movement of the back edge of the fender, which of course moves with the platform, the result being that the forward edge of the fender remains at practically the same distance from the rails at all times. It will be obvious that should the rear end of the car be raised and the front end depressed bell-crank levers 11 and 13 and links 15 and 16 will be moved slightly forward instead of backward, the amount of movement depending, of course, upon the amount of depression of the front end of the car. The result is that when the front end of the car is depressed, carrying the back edge of the fender toward the rails, the forward movement of bell-crank levers 11 and 13 and links 15 and 16, through the connecting-rods 18, will swing the angle-arms 10 forward and carry the forward edge of the fender relatively forward and raise it relatively a distance corresponding to the distance the back edge thereof has been depressed, so that, as before, the position of the forward edge of the fender relative to the rails will remain practically unchanged by the changes in position of the front platform, to which the back edge of the fender is pivoted.

The operation of my preferred form of fender will be readily understood from Figs. 3 and 4 in connection with the above description. It will be obvious that when either side of the car is raised bell-crank levers 11 and 13 and links 15 and 16 will be swung toward the front, the effect of which will be, through the connecting-rod 18 and angle-arm 10 on that side of the car, to depress the forward edge of the fender on that side in the manner already described. It will be obvious, furthermore, that when one side of the car is raised it must result from relative depression of the other side of the car, the effect of which necessarily is to swing the bell-crank levers 11 and 13 and the links 15 and 16 on the depressed side of the car backward, which will draw the connecting-rod 18 on that side of the car backward and will raise that side of the forward edge of the fender, the hinges 29 yielding upward freely. It follows, therefore, that so long as the opposite sides of the front end of the car move upward and downward together the forward edge of the fender will move downward when the front end of the car moves upward, and vice versa, and that when one side of the car moves downward the forward edge of the fender on that side will be moved upward correspondingly, and the opposite side of the forward edge of the fender will remain stationary or will be swung downward, depending upon whether that side of the car remains practically stationary or is tilted upward.

Having thus described my invention, I claim—

1. The combination with a car-body and front and rear bearing-pieces, of a fender pivoted to the car-body, connecting and positioning mechanisms pivoted to the car-body and to the front and rear bearing-pieces respectively, a rod connecting the front and rear mechanisms together and a rod connecting said mechanisms with the fender.

2. The combination with a car-body and front and rear bearing-pieces, of a fender pivoted to the car-body, connecting and positioning mechanisms pivoted to the car-body and to the front and rear bearing-pieces respectively, and rods connecting said mechanisms together and to the fender.

3. The combination with a car-body, a fender attached thereto, and front and rear bearing-pieces, of mechanisms intermediate said bearing-pieces and said car-body and said fender, said mechanisms being connected together, whereby the front edge of the fender is maintained at a relatively uniform distance from the track, the motion from one of said mechanisms partially counteracting the motion from the other when the car-body is moved up or down, and the motion from both mechanisms combining to move the fender when the car-body is tilted endwise.

4. The combination with a car-body and bearing-pieces, of a fender and connecting and positioning mechanisms intermediate the bearing-pieces and car-body and the fender, each mechanism comprising a bell-crank lever pivoted to the car-body, a bell-crank lever pivoted to the bearing-piece, a link 15 connecting the free ends of said bell-crank levers and a link 20 connecting the angles of said bell-crank levers, one of said mechanisms having a link 16 pivoted to the link 15, and said mechanisms being connected by a rod extending from link 16 to the other link 15.

5. The combination with a car-body, bearing-pieces and a fender having an angle-arm at its back edge, of bell-crank levers 11 pivoted to the car-body, bell-crank levers 13 pivoted to the bearing-pieces respectively, links 15 connecting the free ends of the bell-crank levers, links 20 connecting the angles of the bell-crank levers, a link 16 pivoted to one of the links 15, a rod connecting link 16 to the other link 15, and a rod connecting link 16 with the angle-arm.

6. The combination with a car-body, bearing-pieces and a fender pivoted to the car-body, of bell-crank levers 11 pivoted to the car-body, bell-crank levers 13 pivoted to the bearing-pieces respectively, links 15 connecting the free ends of the bell-crank levers, links 20 connecting the angles of the bell-crank levers, a rod connecting the mechanisms at the front and rear bearing-pieces together and a rod connecting said mechanisms with the fender.

7. The combination with a car-body, bearing-pieces and side bars, of bell-crank levers 11 pivoted to the car-body, bell-crank levers 13, links 22 intermediate bell-crank levers 13 and the bearing-pieces, and links 24 pivoted to bell-crank levers 13 and links 22 at their pivotal points and also pivoted to the side bars.

8. The combination with a car-body and front and rear bearing-pieces, of bell-crank levers pivoted to the car-body, other bell-crank levers pivoted to the bearing-pieces respectively, links connecting the free ends of each bell-crank lever on the car-body with a bell-crank lever on a bearing-piece, links connecting the angles of said bell-crank levers and a rod connecting the front and rear mechanisms together.

9. The fender C comprising parts C', C², hinged together at diagonally opposite corners, substantially as shown, for the purpose specified.

10. The fender C comprising parts C', C², hinged together at diagonally opposite corners, each of said parts having an angle-arm 10, one of which is forward of the corresponding hinge the other back of the corresponding hinge, substantially as shown, for the purpose specified.

11. The combination with a car-body, bearing-pieces and a fender consisting of two parts hinged together at diagonally opposite corners, one of said parts having an angle-arm forward of the hinge and the other part an angle-arm back of the hinge, of connecting and positioning mechanisms pivoted to the front and rear bearing-pieces respectively and to the car-body on each side thereof, and rods connecting the mechanisms on each side of the car-body together and to the corresponding angle-arm.

12. The combination with a car-body, bearing-pieces and a fender consisting of two parts hinged together at diagonally opposite corners, one of said parts having an angle-arm forward of the hinge and the other part an angle-arm back of the hinge, of connecting and positioning mechanisms pivoted to the front and rear bearing-pieces respectively and to the car-body on each side thereof and rods connecting said mechanisms to each other and to the respective angle-arms, the parts of the front and rear mechanisms being laid out and proportioned differently so as to cause said mechanisms to produce different degrees of motion, the movement imparted to the fender by an up-and-down movement of the car-body being the excess of motion of one mechanism over the other, and the motion imparted to the fender by an end-to-end tilting of the car-body being the motion of one mechanism added to the other.

13. The combination with a car-body, bearing-pieces and a fender pivoted to the car-body, of connecting and positioning mechanisms pivoted to the car-body and to the bearing-pieces respectively and rods connecting said mechanisms with the fender, the parts being so constructed and arranged that when the end of the car to which the fender is pivoted moves downward the forward edge of the fender will be correspondingly raised.

14. The combination with a car-body, bearing-pieces and a fender pivoted to the car-body and having an angle-arm, of connecting and positioning mechanisms pivoted to the car-body and to the bearing-pieces respectively, a rod connecting the front and rear mechanisms and a rod connecting said mechanisms with the angle-arm.

15. The combination with a car-body, bearing-pieces and a fender pivoted to the car-body, of a connecting and positioning mechanism pivoted to the car-body and to the front bearing-piece, a connecting and positioning mechanism pivoted to the car-body and to the rear bearing-piece and laid out and constructed to produce a different amount of motion from the other mechanism and rods connecting said mechanisms to the fender.

16. The combination with a car-body, front and rear bearing-pieces and a fender pivoted to the car-body and having an angle-arm, of connecting and positioning mechanisms intermediate the angle-arm and the car-body and bearing-pieces respectively, the front and rear mechanisms being so laid out and proportioned as to produce different amounts of motion, so that when the car-body is moved up and down the amount of motion imparted to the fender will be the excess of motion of one mechanism over the other, but when the car tilts from end to end the aggregate of the motions of the two mechanisms will be imparted to the angle-arm and will raise the forward edge of the fender when the end of the car to which it is pivoted moves downward, and vice versa.

17. The combination with a car-body, bearing-pieces and a fender consisting of two parts hinged together at diagonally opposite corners, one of said parts having an angle-arm forward of the hinge and the other part an angle-arm back of the hinge, of connecting and positioning mechanisms pivoted to the car-body and to the bearing-pieces respectively and rods connecting said mechanisms with the angle-arms respectively.

18. The combination with a car-body and bearing-pieces, of connecting and positioning mechanisms each comprising a system of levers and links pivoted to the car-body and to the bearing-pieces respectively and a rod connecting said mechanisms.

19. The combination with a car-body and bearing-pieces, of connecting and positioning mechanisms each comprising a system of levers and links pivoted to the car-body and to the bearing-pieces respectively, each mechanism being laid out to produce a different amount of motion from the other mechanism, and a rod connecting said mechanisms, the parts being so constructed and arranged that when the car-body is moved up and down the movement of one mechanism will partially counteract the movement of the other mechanism, but when the car-body is tilted from end to end the motion of one mechanism will supplement the motion of the other mechanism.

In testimony whereof I affix my signature in presence of two witnesses.

ALEXANDER O. LAMSON.

Witnesses:
   A. M. WOOSTER,
   S. W. ATHERTON.